US010765092B2

(12) United States Patent
Cahill

(10) Patent No.: US 10,765,092 B2
(45) Date of Patent: Sep. 8, 2020

(54) ROTARY HIGH LIFTER AND CONTROLLED DESCENDER

(71) Applicant: Russell Jeffrey Cahill, Woodland Park, CO (US)

(72) Inventor: Russell Jeffrey Cahill, Woodland Park, CO (US)

( * ) Notice: Subject to any disclaimer, the term of this patent is extended or adjusted under 35 U.S.C. 154(b) by 138 days.

(21) Appl. No.: 16/029,513

(22) Filed: Jul. 6, 2018

(65) Prior Publication Data
US 2018/0320814 A1 Nov. 8, 2018

Related U.S. Application Data

(60) Provisional application No. 62/502,666, filed on May 6, 2017.

(51) Int. Cl.
| A01K 39/01 | (2006.01) |
| F16M 11/18 | (2006.01) |
| F16M 11/04 | (2006.01) |
| G05G 1/08 | (2006.01) |
| F16H 19/06 | (2006.01) |
| F16H 31/00 | (2006.01) |
| A01K 31/14 | (2006.01) |

(52) U.S. Cl.
CPC ............ *A01K 39/01* (2013.01); *F16H 19/06* (2013.01); *F16H 31/002* (2013.01); *F16M 11/046* (2013.01); *F16M 11/18* (2013.01); *G05G 1/085* (2013.01); *A01K 31/14* (2013.01)

(58) Field of Classification Search
CPC .... A01K 39/00; A01K 39/01; A01K 39/0113; F16H 2007/0853; F16H 31/002; B66D 1/04; B66D 1/06; B66D 5/06; B66D 5/20; B66D 1/02; B66D 2700/0116; B66D 2700/07; B66D 2700/0183
See application file for complete search history.

(56) References Cited

U.S. PATENT DOCUMENTS

| 2,590,610 A | * | 3/1952 | Grosch | B66D 1/06 254/344 |
| 3,939,729 A | * | 2/1976 | Brockelsby | B66D 5/34 74/575 |
| 5,339,767 A | * | 8/1994 | Krag | A01K 39/014 119/57.8 |
| 5,794,563 A | * | 8/1998 | Klepac | A01K 39/014 119/51.11 |
| 6,116,580 A | * | 9/2000 | Hull | B66D 1/06 254/357 |

(Continued)

*Primary Examiner* — Michael McCullough

(57) ABSTRACT

A rotary high lifter and controlled descender has a main housing enclosing a ratchet spool, controlled descender, and locking pawl. An adjustable crank turns the ratchet spool and takes up rope which raises an attached feeder, nestbox, etc. The locking pawl assures that as the rope is wound, the lifter/descender automatically locks in place so that an inadvertent crank release of the crank does not cause the feeder to fall. The rope exits the main housing via an inlet nipple which protects the housing from the elements, insects, etc. To lower the feeder, actuate a cam lock to release the locking pawl, and turn the crank in the opposite direction. Releasing the cam lock can actuate a controlled descender portion of the invention. These components apply a brake-pad-like action against the ratchet spool (can also use a tension knob) to control the speed of rotation and descent.

3 Claims, 17 Drawing Sheets

(56) References Cited

U.S. PATENT DOCUMENTS

| | | | | |
|---|---|---|---|---|
| 6,202,868 B1 * | 3/2001 | Murray | ............ | A22B 5/06 |
| | | | | 212/227 |
| 6,431,525 B1 * | 8/2002 | Roll | ............ | B66D 1/04 |
| | | | | 254/357 |
| 7,793,919 B2 * | 9/2010 | Guyard | ............ | B66D 5/18 |
| | | | | 254/345 |
| 7,967,278 B2 * | 6/2011 | Anderson | ............ | B60P 3/1066 |
| | | | | 254/342 |
| 8,231,109 B2 * | 7/2012 | Peng | ............ | B65H 75/28 |
| | | | | 242/388.5 |
| 8,550,065 B2 * | 10/2013 | Johnson | ............ | A47J 33/00 |
| | | | | 126/25 A |
| 8,695,945 B2 * | 4/2014 | Guyard | ............ | B66D 1/06 |
| | | | | 254/342 |
| 9,791,099 B1 * | 10/2017 | Page | ............ | B66C 23/166 |

* cited by examiner

ROTARY HIGH LIFTER AND CONTROLLED DESCENDER

CROSS-REFERENCE TO RELATED APPLICATIONS

This application claims the benefit of U.S. Provisional Application No. 62/502,666 and having a filing date of May 8, 2017, which is specifically incorporated by reference herein for all that it discloses and teaches.

TECHNICAL FIELD

The present invention relates generally to the field of animal/bird feeders; and more specifically, to a rotary high lifter and controlled descender for raising bird feeders, nesting boxes, etc. out of reach of pests and allowing a user to easily control the descent for cleaning, filling, etc.

BACKGROUND

There is a vast array of feeders available for the residential and back yard birding enthusiast to feed birds and/or other animals. Some are designed to sit on a deck railing or the top of a post, but many are designed to be hung up so that birds may reach them and feed without being threatened from terrestrial predators (such as house cats, weasels, foxes, etc.). Additionally, by raising the bird feeder far from the ground, the attempt can be made to reduce access to the feeder by unwanted animals. Whether or not an animal is unwanted at a particular feeder varies widely between persons; regardless, it may be difficult to keep certain types of non-bird species away from feeders. For example, many people do not want to feed pests and are constantly waging a battle to keep them from feeding at what is supposed to be a bird feeder. Similarly, bird nesting boxes also benefit from being located high above the ground. Additionally, positioning feeders (hereinafter, the term "feeders" can be interpreted to also include nesting boxes and similar) near second-story (or higher) windows, decks, etc. can be doubly advantageous as it makes them safer for the birds to use and provides closer views for the people watching the birds.

There are many unique and novel devices that have been developed in attempts to keep pests from accessing bird feeders. Some are more successful than others. Regardless of their efficacy, many such devices are complex, ugly, expensive and difficult to use. Instead, what some try is to hang their feeders sufficiently far off the ground to keep pests from reaching them. However, such tactics can make accessing such bird feeders (to clean, refill, etc.), a very difficult and even dangerous job, especially when ladders are involved. Although placing bird feeders far off the ground minimizes access to said feeders from pests jumping upwards from the ground, it still leaves pests the option of climbing whatever tree, pole, or other object the bird feeder is suspended from and then climbing down the rope to reach the bird feeder from above.

What is needed is a device which can suspend bird feeders significant vertical distances from the ground, can protect the suspension rope so that pests can't climb down to the feeder via the rope, and provides the user a simple means of accessing the feeder for refilling, cleaning, etc. A co-pending patent application for a high lift feeder protector meets this need. However, lifting feeders to such heights can be a difficult job. Furthermore, safely lowering heavy feeders, nesting boxes, etc. can pose additional problems. Therefore, what is needed is a device that allows a user to quickly, easily, and safely raise feeders to high locations and also lower them in a controlled descent for servicing.

BRIEF SUMMARY OF THE INVENTION

A rotary high lifter and controlled descender utilizes a main housing that encloses and protects a ratchet spool, a controlled descender, and a locking pawl. An external adjustable leverage crank can be actuated by a user to turn the ratchet spool and thereby take up a suspension rope which raises an attached feeder and/or nesting box. The suspension rope can be strung over a simple pulley or, optimally, can be protected within the high lift feeder protector mentioned above. In another embodiment, the rotary high lifter and controlled descender can be used for other raising/lowering/moving purposes including hoisting flags, weather monitors, etc.

The suspension rope can be any rope, chain, wire, or other similar material which is relatively strong and yet flexible so that it can be wrapped around the hub of the ratchet spool for take-up. The locking pawl assures that as the suspension rope is taken up, the rotary high lifter and controlled descender automatically locks in place so that an inadvertent release of the crank does not cause the feeder to rapidly fall back to the ground.

A distal end of the suspension rope can be affixed (permanently, removably, quick-detachably, etc.) to a hanger on a feeder. If a particular feeder does not have a hanger, one can usually be added quite simply by attachment to an upper surface that is somewhat near the center of gravity of the feeder (to ensure the feeder hangs approximately level). The suspension rope runs from the ratchet spool out of the main housing via an inlet nipple which helps to minimize access to the inside of the main housing to protect it from the elements, insects, etc.

When the user wishes to lower the feeder, he or she simply actuates a cam lock to release the locking pawl, and then turns the crank the opposite direction. Releasing the cam lock can actuate a controlled descender portion of the invention. These components apply a brake pad like action against the ratchet spool to control the speed of rotation; and hence, to control the speed of descent of the feeder. In another embodiment, a second braking action can be incorporated via a tightening of a tension knob which increases friction against the ratchet spool and helps to control the speed of rotation thereof. In yet another embodiment, another device can be used to actuate the controlled descender besides a cam lock.

The rotary high lifter and controlled descender can be mounted to a side of a building; a tree; building eaves, roofs, and walls; fences; concrete pads or footers; the ground; barriers and other upright wall structures; deck railings, posts, structural members, or other deck portions; etc.

DETAILED DESCRIPTION

Figure 1:
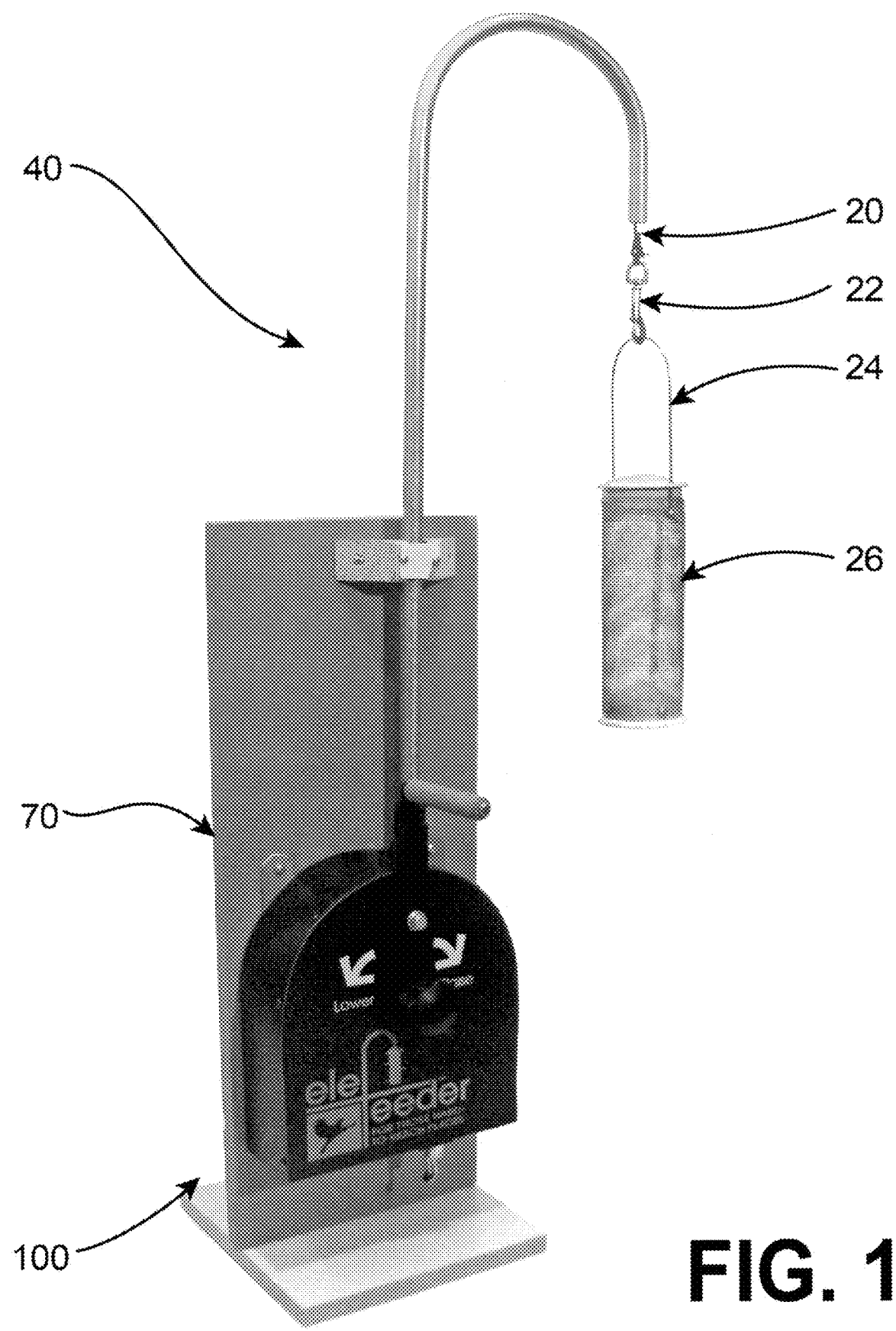
FIG. 1 illustrates a front perspective view of an exemplary embodiment of a rotary high lifter and controlled descender with a bird feeder in a raised position ready for feeding.

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples. Similarly, in this disclosure, language such as "could, should, may, might, must, have to, can, would, need to, is, is not", etc. and all such similar language shall be considered interchangeable whenever possible such that the scope of the invention is not unduly limited. For example, a comment such as: "item X is used" can be interpreted to read "item X can be used".

Exemplary embodiments are described below and in the accompanying Figures. The following detailed description provides a review of the drawing Figures in order to provide a thorough understanding of, and an enabling description for, these embodiments. One having ordinary skill in the art will understand that in some cases well-known structures and functions have not been shown or described in detail to avoid unnecessarily obscuring the description of the embodiments.

Referring now to the drawings, FIG. 1 illustrates a front perspective view of an exemplary embodiment of a rotary high lifter and controlled descender 100 with a bird feeder 26 in a raised position ready for feeding. In this mock-up, the lifter/descender 100 is mounted to a mounting location 70 (here, a simple vertical board). A high lift feeder protector 40 is used to protect and guide the suspension rope 20 from the lifter/descender 100 to the feeder 26. At the distal end of the suspension rope 20 is a rope clip 22. The rope clip can allow for the suspension rope to be affixed (permanently, removably, quick-detachably, etc.) to a hanger 24 on the feeder 26.

The feeder 26 in FIG. 1 is in a raised position. It was raised to said position by a user turning the crank 200 (see later Figures) to collect the suspension rope within the rotary high lifter and controlled descender 100. To lower the feeder, the user would simply activate the cam lock release (see later Figures) and turn the crank 200 counterclockwise to play out the suspension rope 20 from the lifter/descender 100. In other embodiments, the direction of crank turning that lowers the feeder can be clockwise. In other embodiments, a motor or other device can automate the raising and lowering functions.

Figure 2:
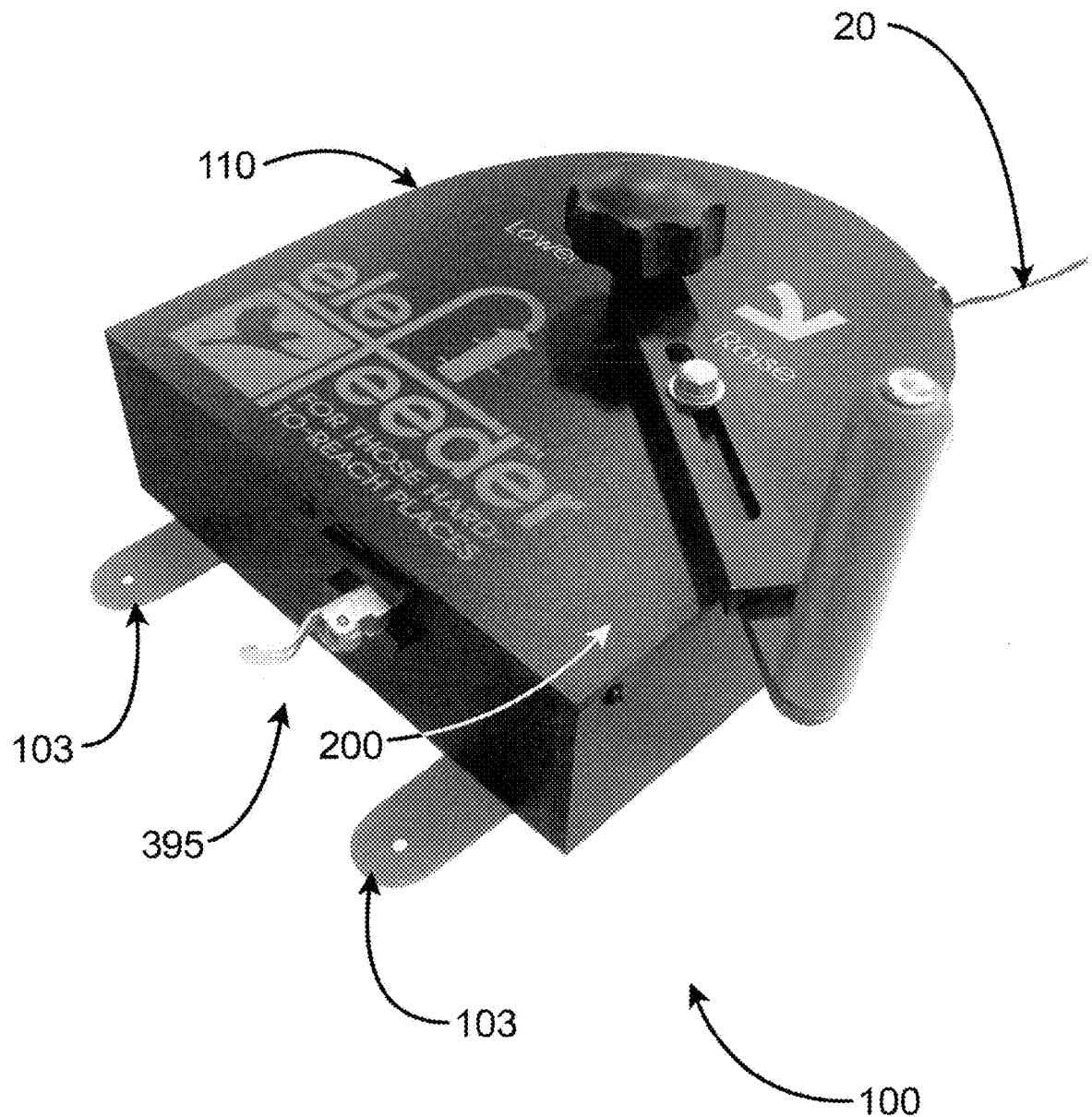
FIG. 2 illustrates a front and side perspective view of an exemplary embodiment of a rotary high lifter and controlled descender.

FIG. 2 illustrates a front and side perspective view of an exemplary embodiment of a rotary high lifter and controlled descender 100. In this view, the cam lock 395 is clearly visible. This is the component that the user could activate in the discussion concerning FIG. 1 above in order to release the locking pawl 500 (see later Figures) and allow the feeder 26 to be lowered. Note that in FIG. 2, the cam lock 395 is shown in the tensioned or locked position, which means that the locking pawl 500 (see later Figures) is released, freeing the ratchet spool 400 (see later Figures) to rotate counterclockwise. Also, when the cam lock 395 is moved to the locked position, this activates the controlled descender 300 (see later Figures), drawing the brake pad 350 down onto the spool 420 and engaging it to brake/slow the descent of the attached feeder 26. When the cam lock 395 is released into the loose or unlocked position, the locking pawl 500 will hold the ratchet spool 400 in place if the adjustable leverage crank 200 is inadvertently released, thereby causing the lifter/descender 100 to hold the feeder in place as well (and not allow it to drop to the ground).

In the embodiment in FIG. 2, the suspension rope is visible extending outwards from the top right portion of the main housing 110. Extending outwards from the front of the main housing 110 is the adjustable leverage crank 200. The user can increase the length of the crank's handle extension relative to the tension knob 206 (see FIG. 5), in order to gain increased leverage for raising/lowering heavier objects. If a particularly light feeder is used, the length of the crank's handle extension can be set to a minimum in order to make raising and lowering easier.

Figure 3A:
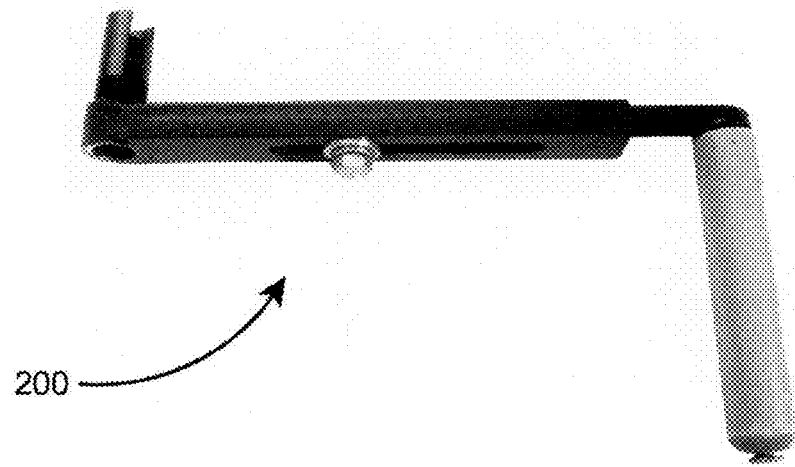
FIG. 3A illustrates a side perspective view of an exemplary embodiment of an adjustable leverage crank component of a rotary high lifter and controlled descender.

FIG. 3A illustrates a side perspective view of an exemplary embodiment of an adjustable leverage crank 200 component of a rotary high lifter and controlled descender. The crank 200 is shown removed from the lifter/descender 100.

Figure 3B:
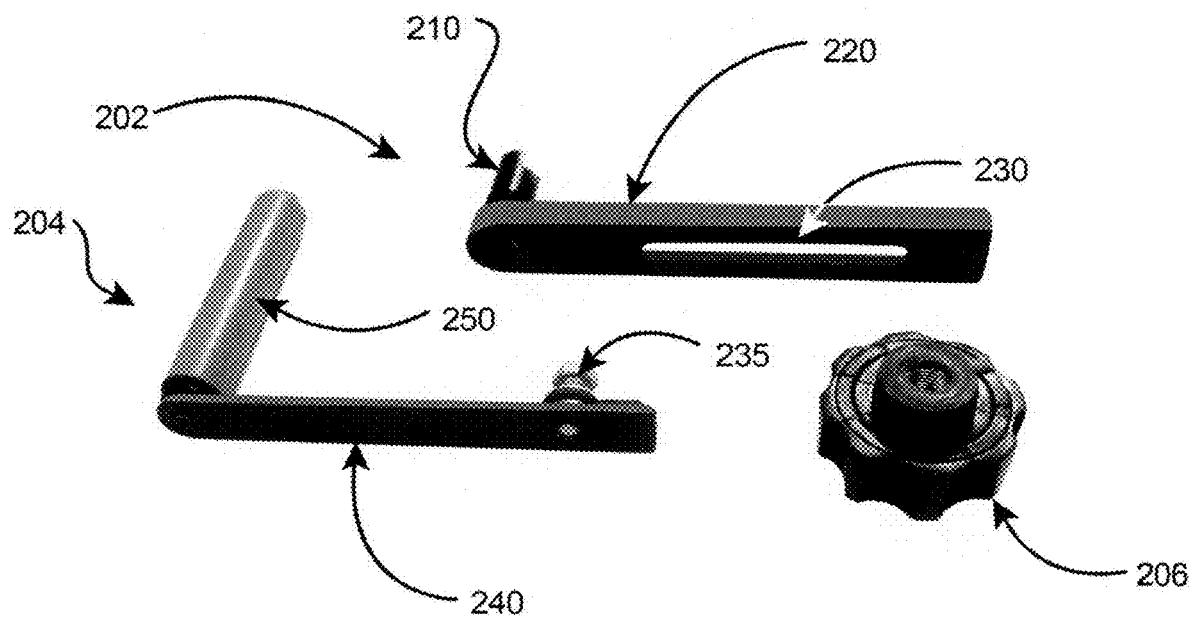
FIG. 3B illustrates a side perspective view of an exemplary embodiment of a set of sub-components for an adjustable leverage crank component of a rotary high lifter and controlled descender.

FIG. 3B illustrates a side perspective view of an exemplary embodiment of a set of sub-components for an adjustable leverage crank 200 component of a rotary high lifter and controlled descender. The sub-components can comprise a crank base 202, a crank handle 204, and a tension knob 206.

The crank base 202 utilizes a crank engagement 210 that engages with the ratchet spool 400 (see later Figures) in order to cause any turning of the crank 200 to cause the ratchet spool to turn as well. Extending generally perpendicular to the crank engagement 210 is a base extension 220. The base extension 220 gives the user leverage by extending the diameter of the circle traversed by the crank grip 250 as it is actuated via a turning motion that is required to turn the ratchet spool one rotation. In order to further accentuate the available leverage, the base extension 220 incorporates a crank adjustment slot 230 that allows the user to adjust the diameter of the aforesaid circle. This is accomplished by loosening the crank adjustment lock 235 and then sliding the handle extension 240 outwards from the base extension 220. Once in the desired position, the crank adjustment lock 235 can be tightened thereby locking the length of the adjustable leverage crank 200 in place.

To raise or lower the feeder, a user simply grasps the crank grip 250 and moves it in a circular motion either clockwise or counterclockwise to raise or lower, respectively, the feeder. In other embodiments, turning the crank 200 in a clockwise direction can lower the feeder and turning in a counterclockwise direction can raise the feeder.

Figure 4:
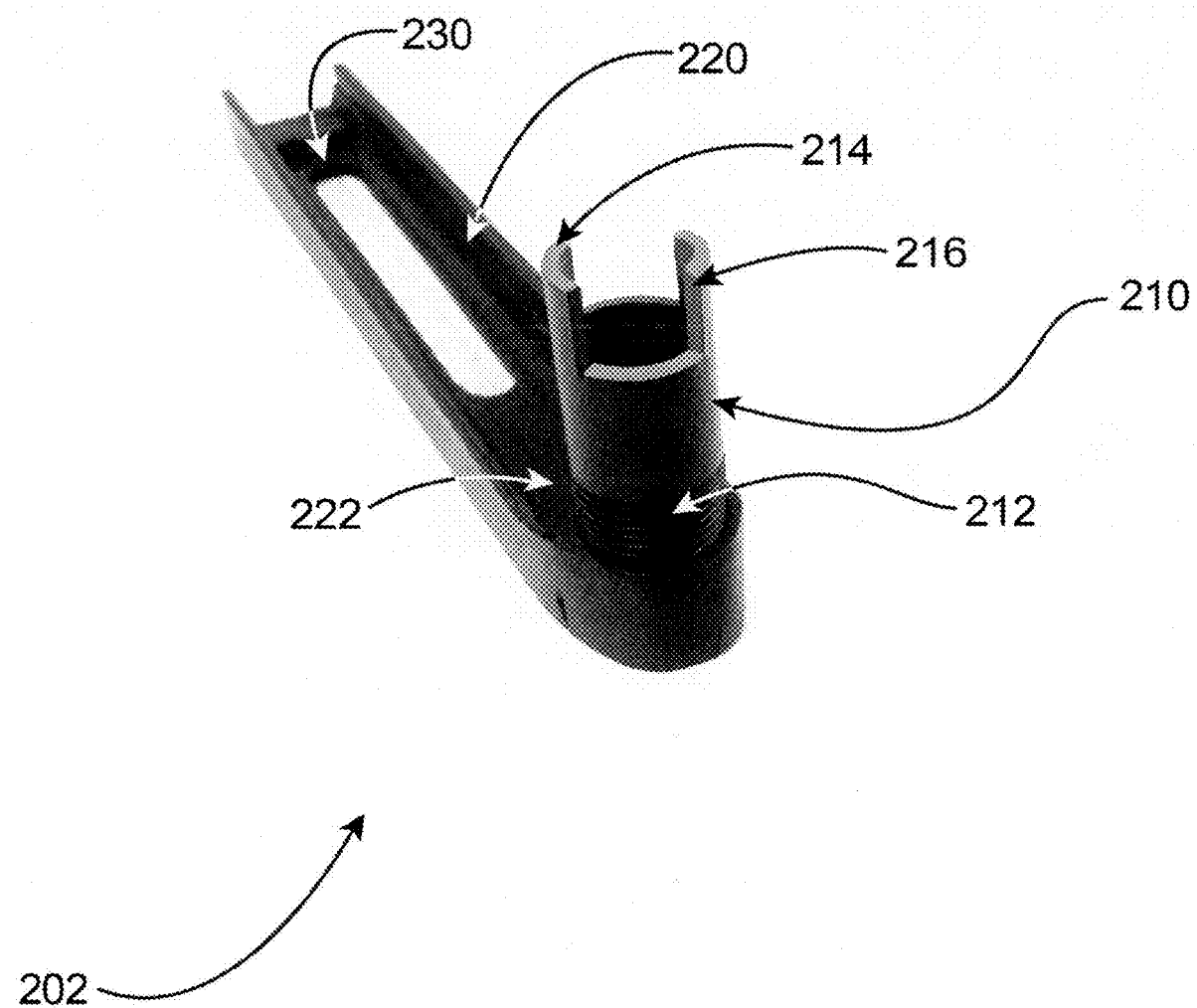
FIG. 4 illustrates a perspective view of an exemplary embodiment of a crank base sub-component.

FIG. 4 illustrates a perspective view of an exemplary embodiment of a crank base sub-component 202. The crank base 202 can comprise a crank engagement 210 that extends into the main housing 110 and connects to the ratchet spool via crank engagement prongs 214 and 216. In other embodiments, other means of connecting the crank base 202 to the ratchet spool are contemplated. In the embodiment illustrate in FIG. 4, the prongs simply engage slots in the ratchet spool so that rotation of the crank base 202 cause the ratchet spool to rotate, and vice-verse.

The crank engagement 210 can connect to the base extension 220 using a crank engagement attachment 212; in the embodiment of FIG. 4, said crank engagement attachment 212 comprises a set of threads that allow the attachment 212 to screw into the base extension port 222 in the base extension 220. The port 222 is tapped to accept the threads and allow the attachment 212 to connect.

Figure 5:
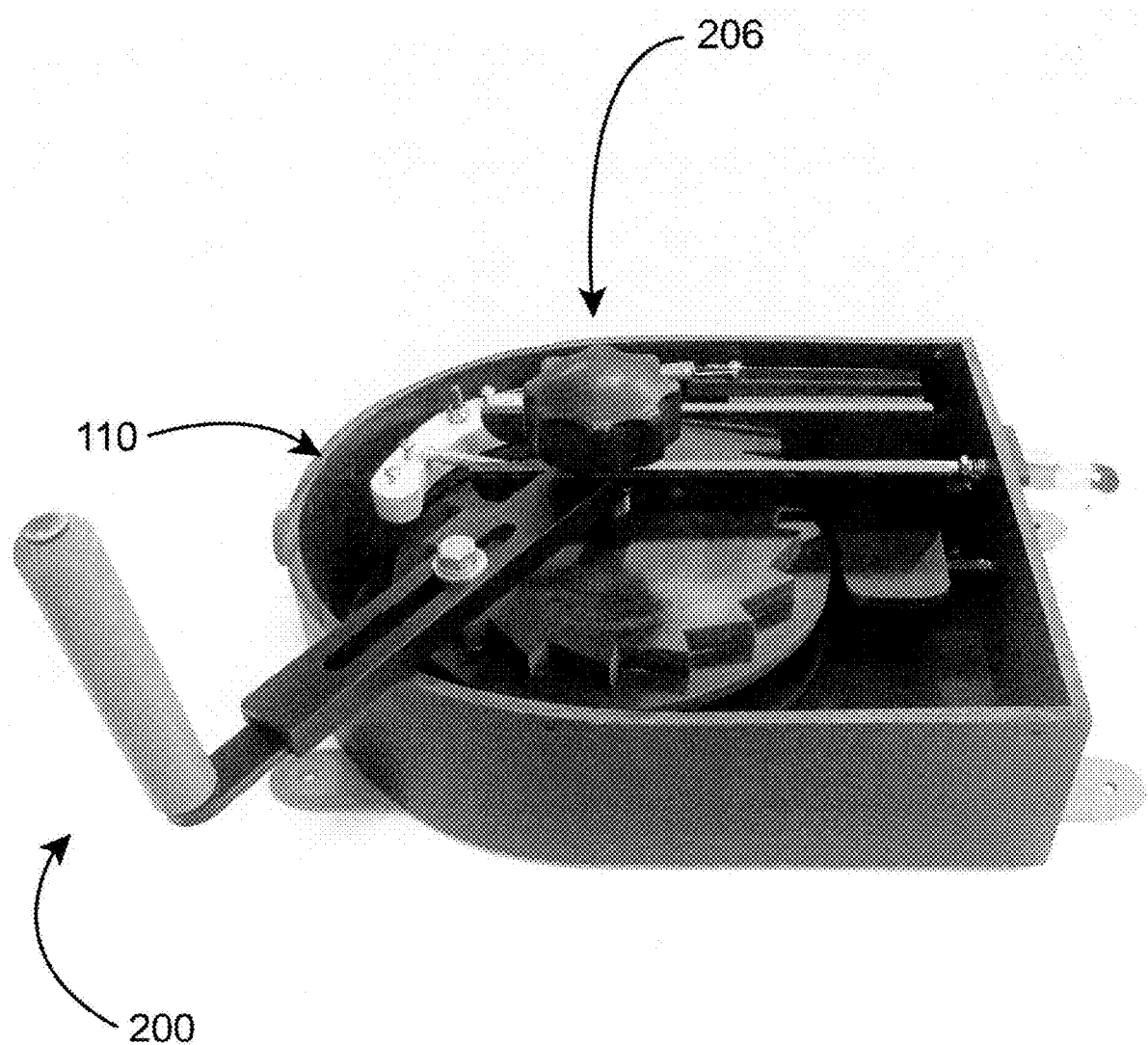
FIG. 5 illustrates a perspective view of an exemplary embodiment of a rotary high lifter and controlled descender with a housing frontplate removed so that the internal components are visible.

FIG. 5 illustrates a perspective view of an exemplary embodiment of a rotary high lifter and controlled descender with a housing frontplate removed so that the internal components begin to be visible. The main housing 110 contains said components. The adjustable leverage crank 200 is shown in place initially in this view, later FIGS. illustrate this component removed as well. Removal of the crank 200 is accomplished by turning the tension knob 206 to unscrew said knob from the lifter axle 280 (see later Figures), remove the knob, and then lift the crank 200 from the ratchet spool.

Conversely, with the tension knob 206 secured in place against the crank 200, further tightening of the tension knob 206 (i.e., screwing it down further), will cause the internal friction to increase and make it easier for the user to gently lower the feeder rather than have the lifter/descender 100 free-spool uncontrollable and drop the feeder rapidly.

Figure 6:
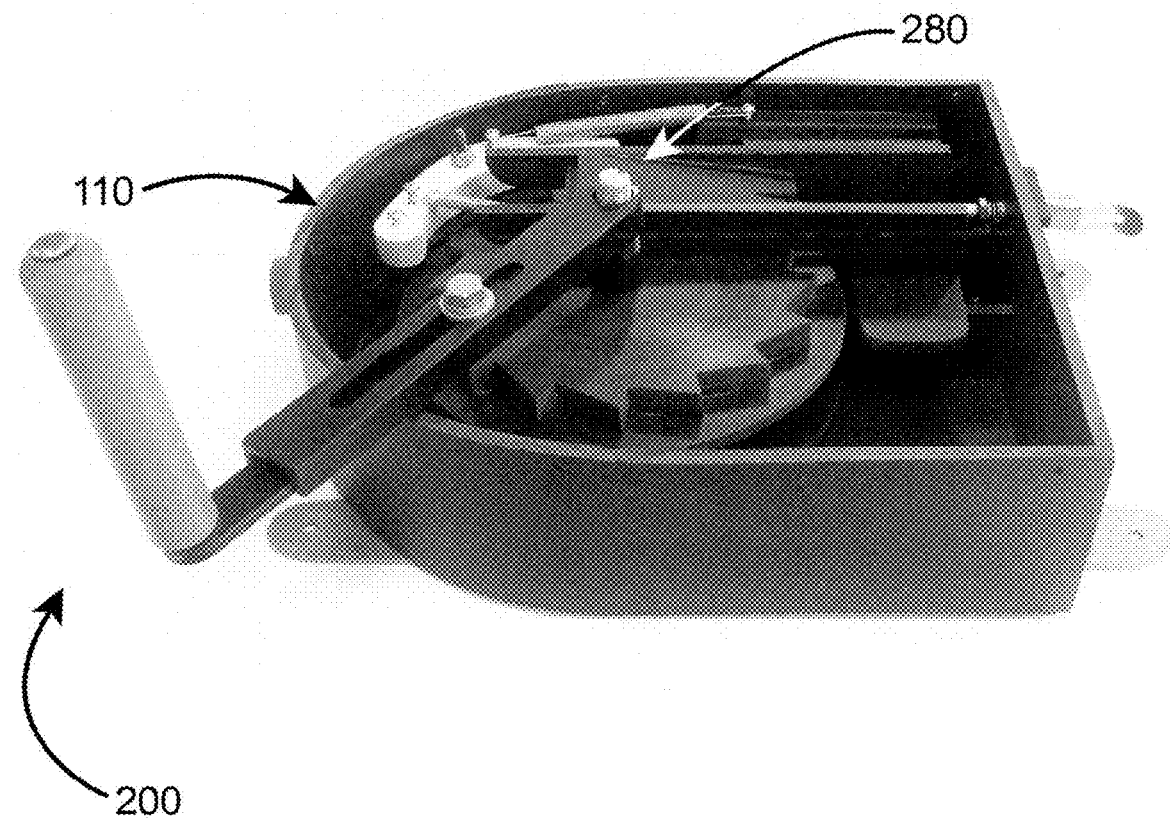
FIG. 6 illustrates a perspective view of an exemplary embodiment of a rotary high lifter and controlled descender with a housing frontplate removed and the adjustable leverage crank in the process of being removed.

FIG. 6 illustrates a perspective view of an exemplary embodiment of a rotary high lifter and controlled descender with a housing frontplate removed and the adjustable leverage crank in the process of being removed. Compare this view to FIG. 5; the tension knob 206 has been removed and the lifter axle 280 is labeled.

Figure 7:
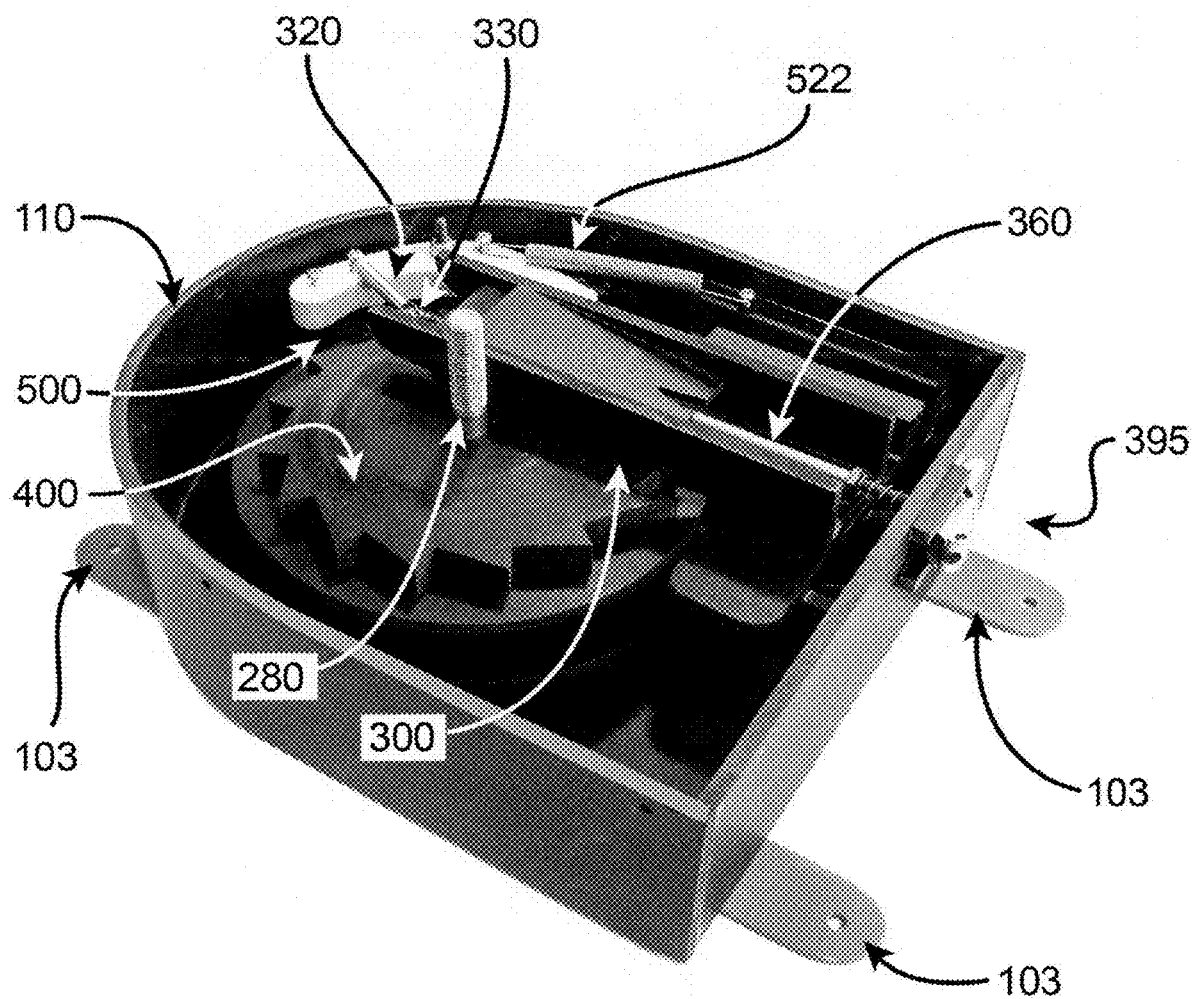
FIG. 7 illustrates a perspective view of an exemplary embodiment of a rotary high lifter and controlled descender with a housing frontplate and adjustable leverage crank removed.

FIG. 7 illustrates a perspective view of an exemplary embodiment of a rotary high lifter and controlled descender with a housing frontplate and adjustable leverage crank removed. In this view, the internal components can be more clearly seen and so they are labeled for reference: the controlled descender 300, the ratchet spool 400, and the locking pawl 500.

The locking pawl 500 assures that as the suspension rope is taken up, the rotary high lifter and controlled descender automatically locks in place so that an inadvertent release of the crank does not cause the feeder to rapidly fall back to the ground. This is accomplished by the pawl tooth engaging within a pawl stop between two ratchet teeth (see later Figures) and holding the ratchet spool in place. The locking pawl 500 can be released by actuating the cam lock 395 and thereby lifting the pawl from engagement with the ratchet spool. The ratchet spool can then turn without encumbrance from the pawl.

When the user wishes to lower the feeder, he or she simply actuates the cam lock 395 to release the locking pawl 500, and then turns the crank counterclockwise, in this embodiment. Simultaneously, the cam lock actuates the controlled descender 300 portion of the invention. The controlled descender 300 components apply a brake pad like action against the ratchet spool to control the speed of rotation; and hence, to control the speed of descent of the feeder.

Figure 14A:
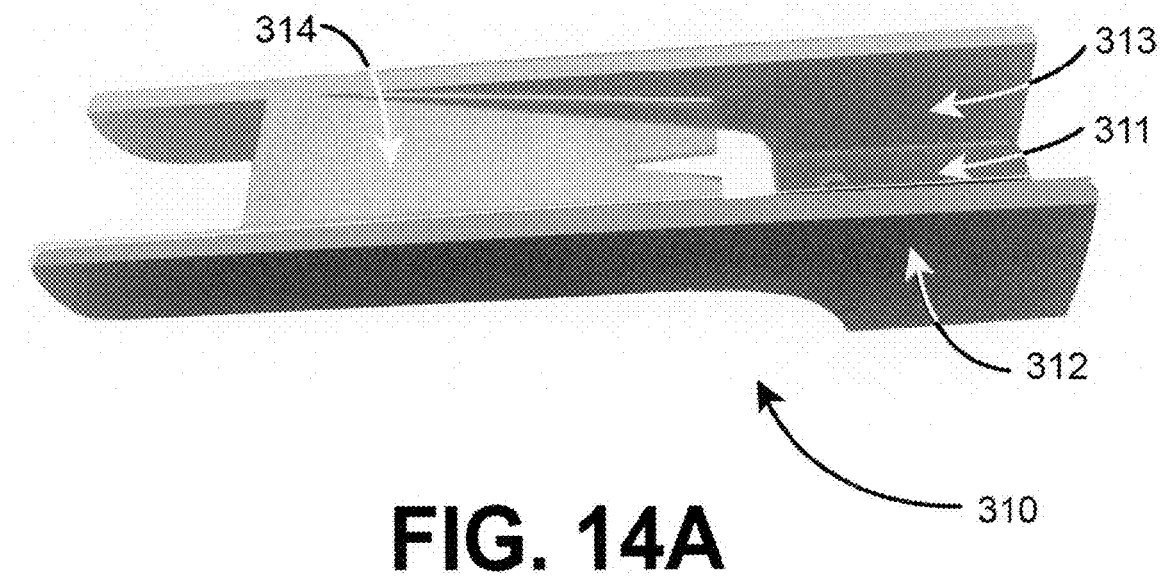
FIG. 14A illustrates a perspective view of an exemplary embodiment of a descender body.
Figure 14B:
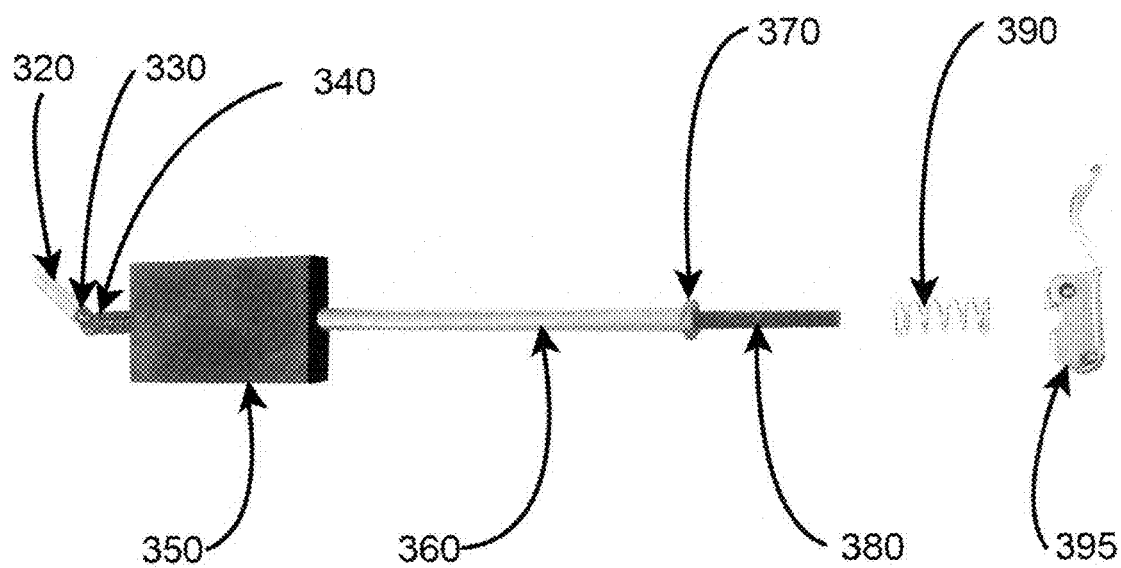
FIG. 14B illustrates a perspective view of an exemplary embodiment of sub-components that can comprise a controlled descender and pawl release.
Figure 14C:
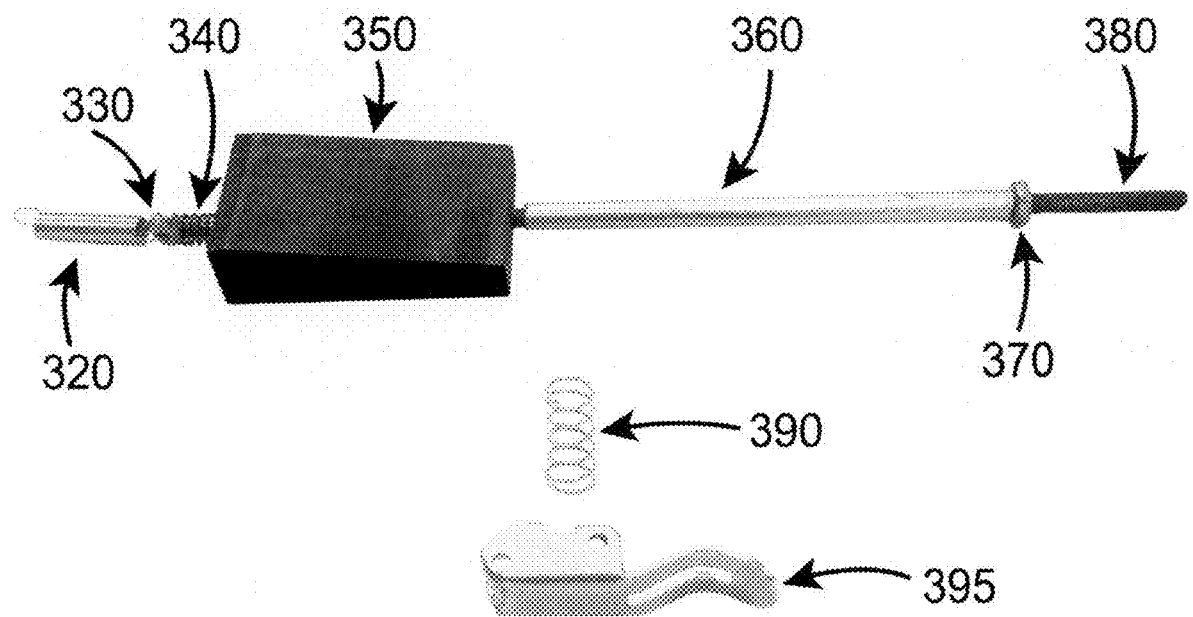
Figure 14D:
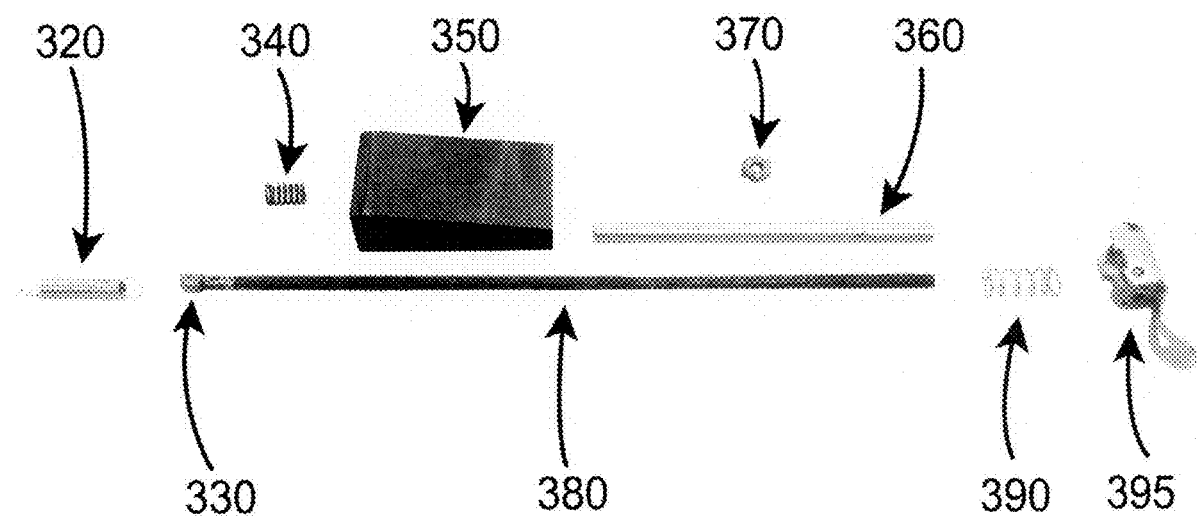

Push rod (tubular sleeve) 360 FIGS. 14C and 14D pushes the wedge-shaped brake pad upward because of the spring tension of connecting member compression spring 390 and releases any engagement of the brake pad 350 friction and thus, regulates the free travel of the spool when the camlock is in the unactuated position.

At the distal end of the connecting member (push rod) 380 FIGS. 14C and 14D is connecting member mount 330 whose drilled hole accommodates pawl release expansion spring 320. That expansion spring can be attached to either 530 or 540 to select the best tensioning point.

The ratchet spool 400 is not completely visible in this illustration. However, the ratchet teeth and top plate of the spool are illustrated. see later Figures for more detail of these components.

The mounting brackets 103 are illustrated in FIG. 7. These brackets allow for easy attachment of the lifter/descender 100 to a mounting location by simply screwing the brackets 103 down. In other embodiments, other means of mounting the lifter/descender 100 are contemplated.

Figure 8:
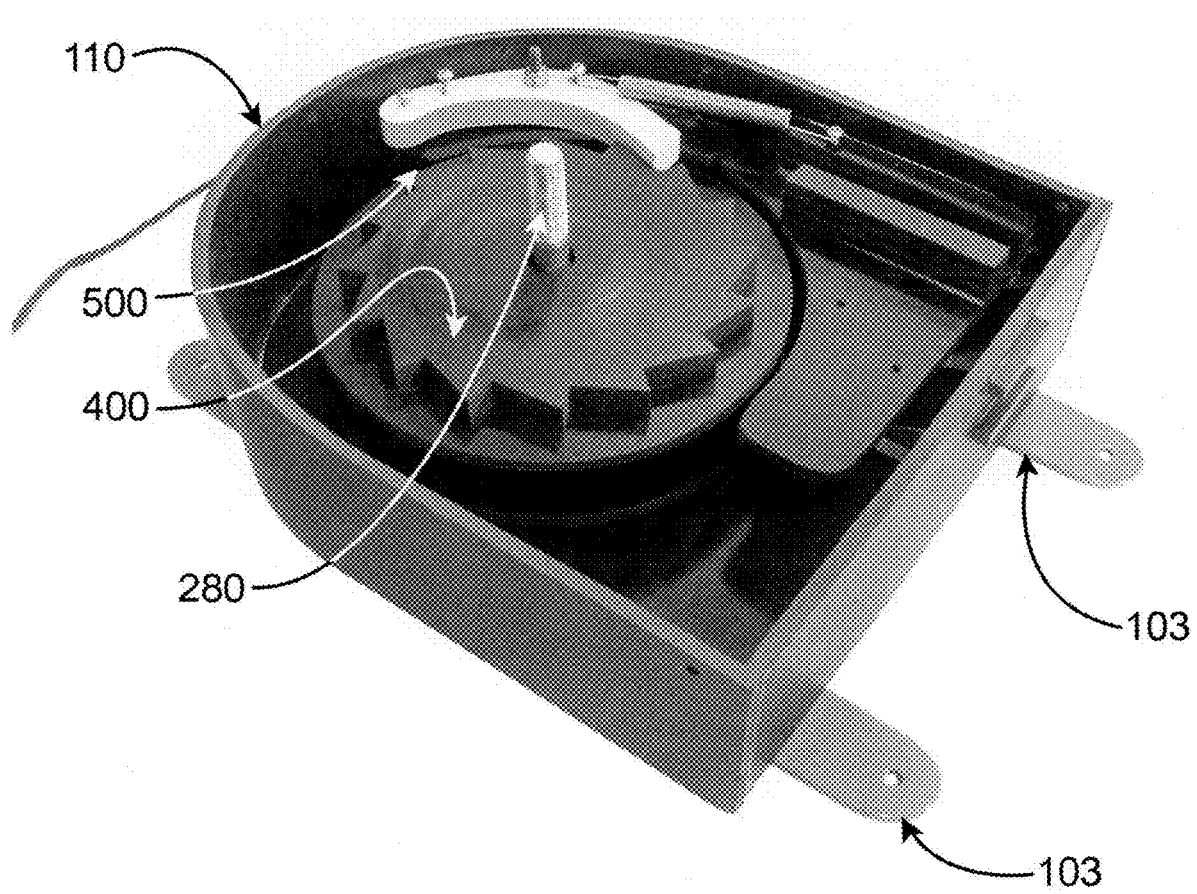
FIG. 8 illustrates a perspective view of an exemplary embodiment of a rotary high lifter and controlled descender with a housing frontplate, adjustable leverage crank, and controlled descender removed.

FIG. 8 illustrates a perspective view of an exemplary embodiment of a rotary high lifter and controlled descender with a housing frontplate, adjustable leverage crank, and controlled descender removed. In this view, more of the ratchet spool 400 is visible as is the engagement of the locking pawl 500 with the ratchet spool 400. Note the spring pulling the pawl down and keeping it engaged within the ratchet teeth. see later Figures for more detail of these components.

Figure 9:
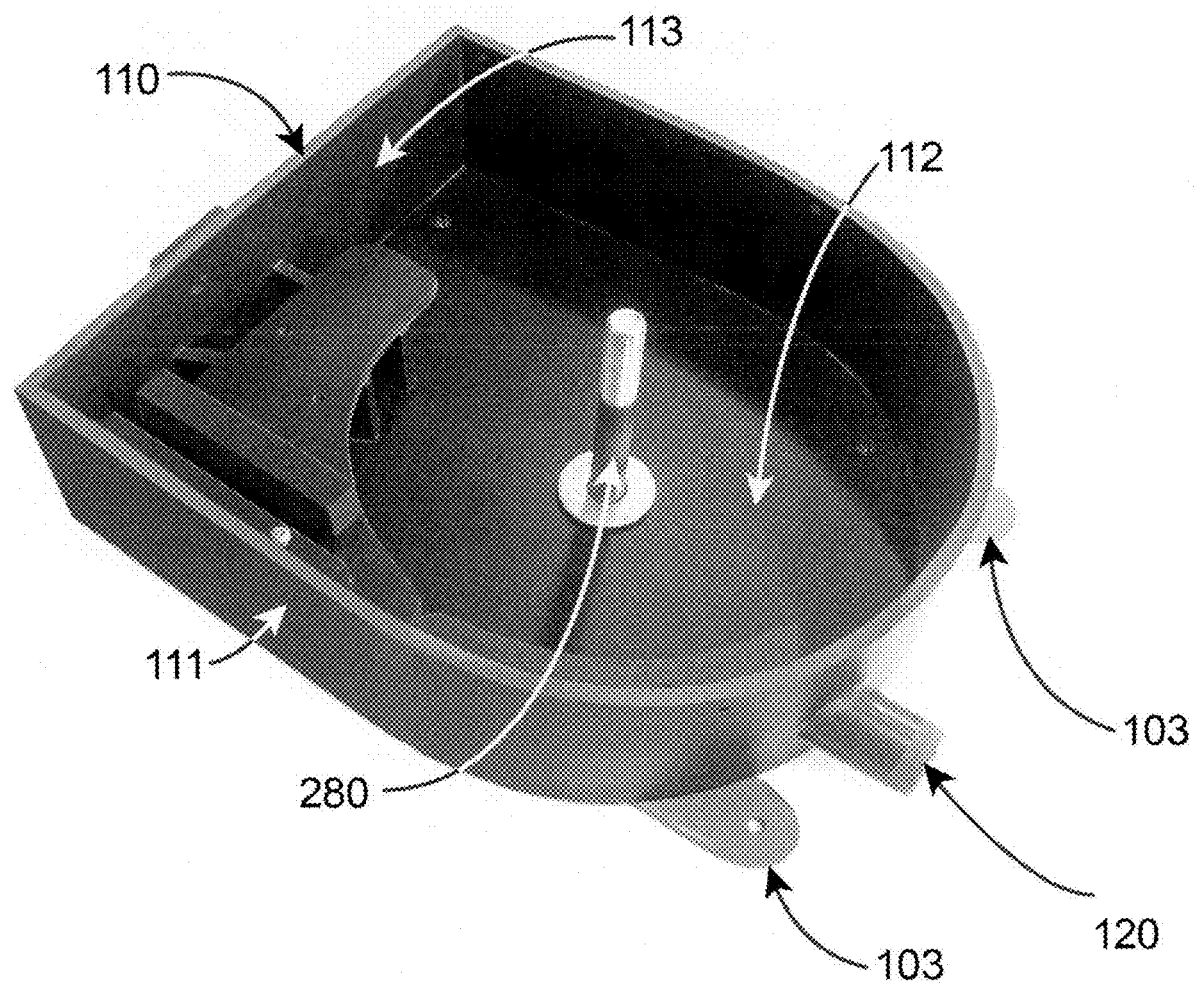
FIG. 9 illustrates a perspective view of an exemplary embodiment of a main housing with most of the internal components removed therefrom.

FIG. 9 illustrates a perspective view of an exemplary embodiment of a main housing with most of the internal components removed therefrom. In this illustration, the lifter axle 280 can be clearly seen. The ratchet spool mounts on the lifter axle 280 and rotates thereabout. The threads at the top of the lifter axle 280 are visible, they allow the tension knob 206 to screw down thereon and hold the crank 200 in place against the spool.

The sub-components that comprise the main housing 110 are labeled in FIG. 9. They include the housing sidewall 111, the housing backplate 112, and the housing base 113.

Together with the housing frontplate 114 (see later Figures), they enclose the internal components of the lifter/descender 100 and protect them from the elements, insects, etc. Note that the inlet nipple 120 is visible in this view. The nipple provides a port for the suspension rope to run through the sidewall 111 of the lifter/descender 100.

Figure 10:
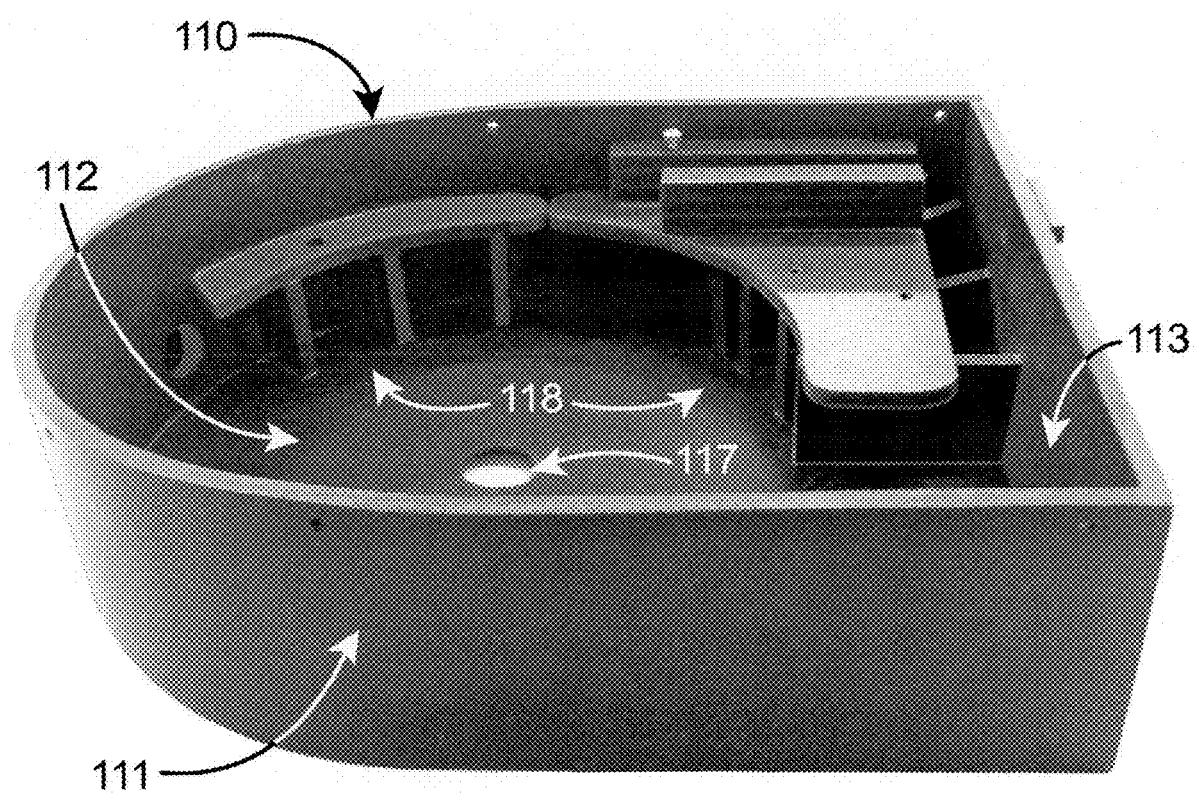
FIG. 10 illustrates a perspective view of an exemplary embodiment of a main housing with most of the internal components removed therefrom.

FIG. 10 illustrates a perspective view of an exemplary embodiment of a main housing with most of the internal components removed therefrom. With the components removed, the housing backplate 112 is visible as is the backplate axle port 117 therein. The axle port 117 allows the lifter axle 280 to extend through the backplate 112 and extend upwards through the interior of the main housing 110.

The additional components referenced in FIG. 10 include a plurality of reinforcing webbing and plating 118. The reinforcing webbing components lend structural support and stiffness to the lifter/descender 100, while the horizontal, flat plating components provide locations on which to mount various internal components such as the locking pawl 500 and the controlled descender 300.

Figure 11A:
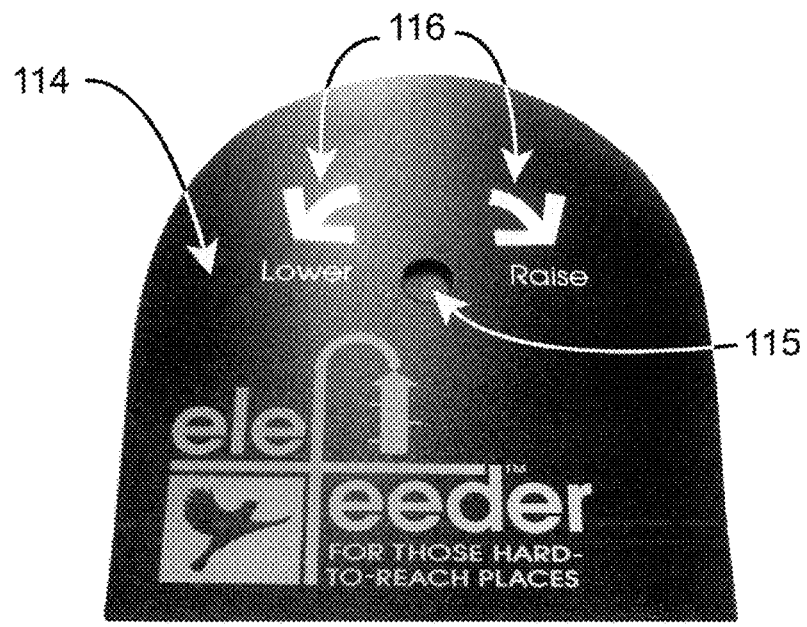
FIG. 11A illustrates a perspective view of an exemplary embodiment of a housing frontplate.

FIG. 11A illustrates a perspective view of an exemplary embodiment of a housing frontplate 114. The frontplate attaches to the housing sidewall 111 when assembled and can be removed to allow access to the internal components (as shown in earlier figures). The frontplate 114 can comprise one or more directional indicia 116 which indicate to the user which directions to turn the crank 200 in order to raise or lower the feeder. Note that there is frontplate axle port 115 extending through the frontplate 114. This provides a port through which the crank 200 can extend in order to engage with the ratchet spool inside of the lifter/descender 100.

Figure 11B:
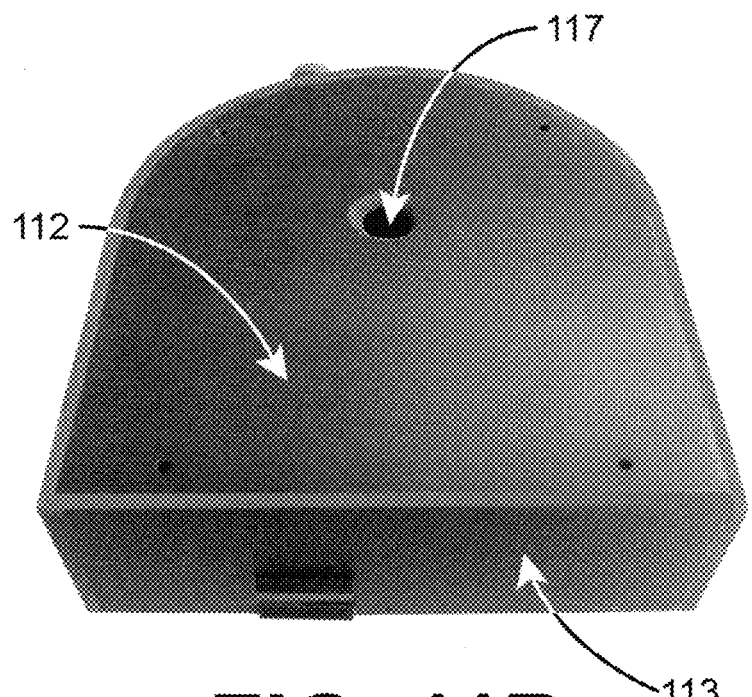
FIG. 11B illustrates a perspective view of an exemplary embodiment of a housing backplate.

FIG. 11B illustrates a rear perspective view of an exemplary embodiment of a housing backplate 112. Note that there is a backplate axle port 117 extending through the backplate 112. This provides a port through which the lifter axle 280 can extend into the interior of the lifter/descender 100.

Figure 12A:
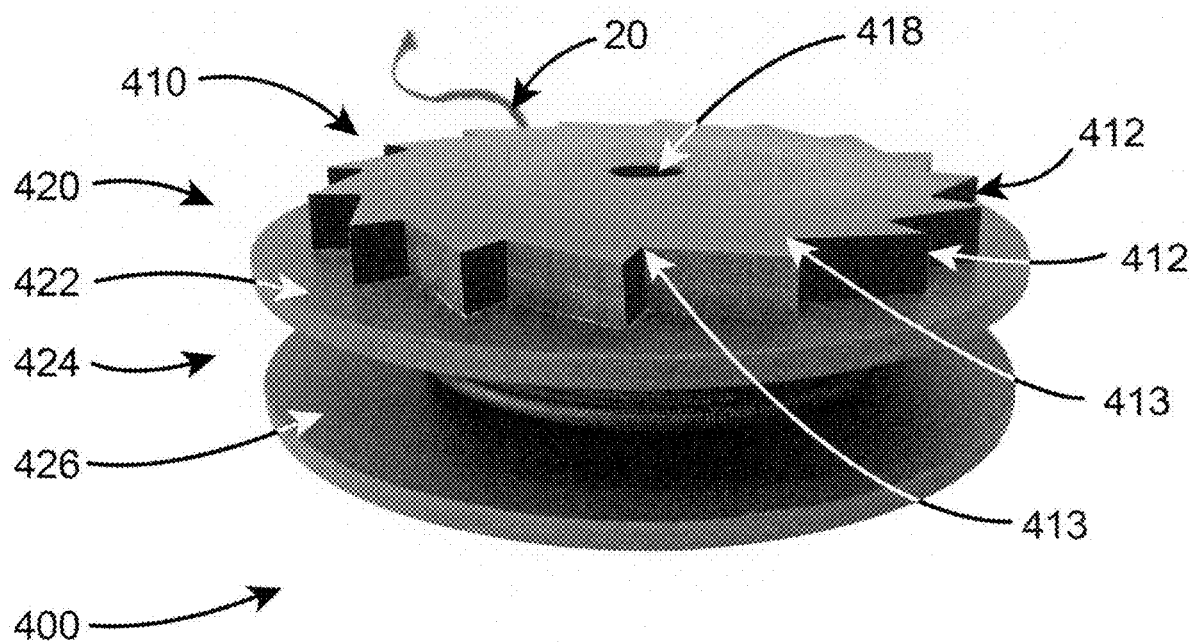
FIG. 12A illustrates a top and side perspective view of an exemplary embodiment of a ratchet spool.

FIG. 12A illustrates a top and side perspective view of an exemplary embodiment of a ratchet spool 400. The ratchet spool 400 comprises a ratchet gear 410 attached to a spool 420. The ratchet gear 410 has a plurality of ratchet teeth 412 separated from one another by pawl stops 413. The pawl stops 413 provide locations in which the pawl tooth can engage in order to stop and hold the ratchet spool in place against the turning pressure exerted on the ratchet spool by the weight of the feeder attempting to pull the suspension rope 20 from the spool 400. Without the locking pawl 500 engaging with the pawl stops 413, the ratchet spool 400 would 'free-spool', allowing the suspension rope 20 to be pulled from the spool 400, and dropping the feeder abruptly to the ground (assuming no other braking means, of course).

Extending from the top of the ratchet gear 410 is the ratchet gear axle port 418, which accepts the crank engagement 210 and crank engagement prongs 214 and 216 therein.

The spool 420 comprises an upper spool plate 422 and a lower spool plate 426 separated from one another by a spool hub 424 that also connects the plates to one another. The spool hub 424 provides the structure around which the suspension rope 20 is wound when the user cranks the lifter/descender 100 to raise the feeder.

Figure 12B:
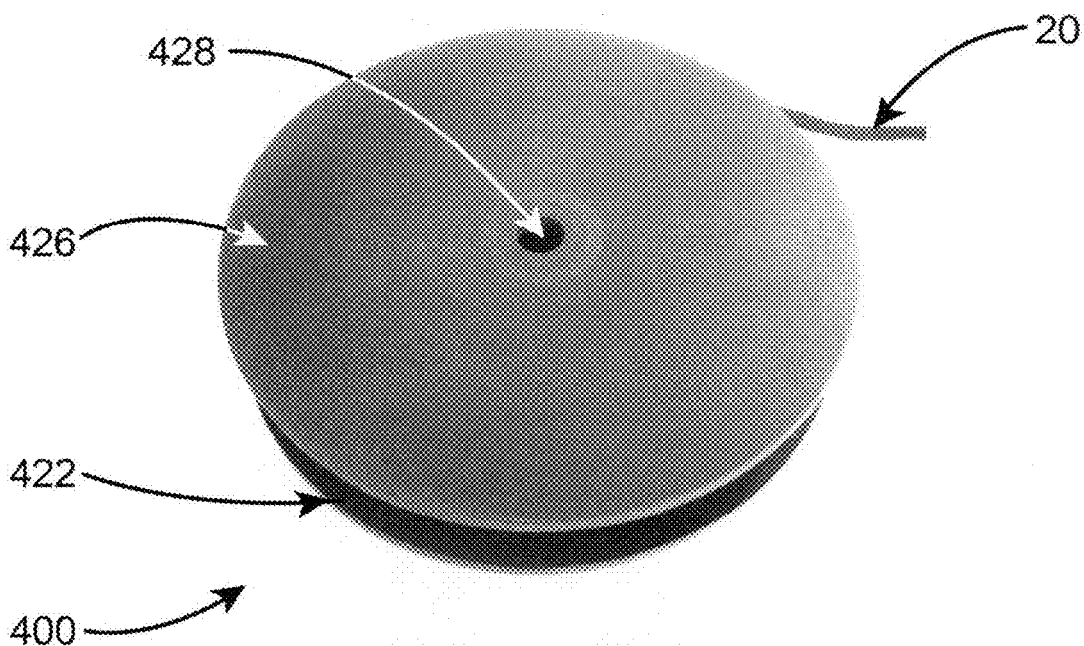
FIG. 12B illustrates a rear perspective view of an exemplary embodiment of a ratchet spool.

FIG. 12B illustrates a rear perspective view of an exemplary embodiment of a ratchet spool 400. The lower spool plate 426 is illustrated from below and in this view, the spool axle port 428 can be seen extending through the lower spool plate 426. This port allows the lifter axle 280 to extend upwards and completely through the ratchet spool 400.

Figure 13:
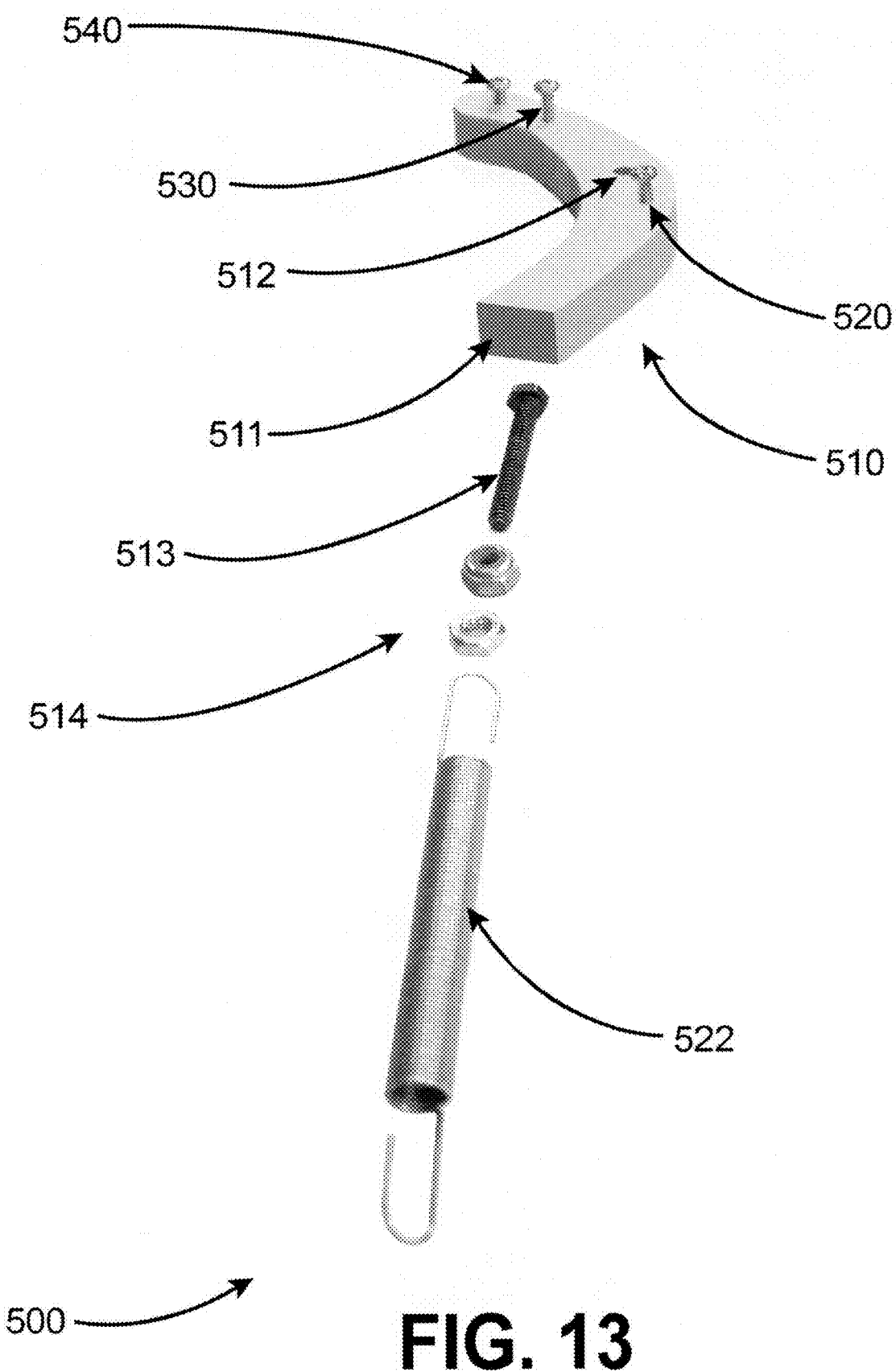
FIG. 13 illustrates a perspective view of an exemplary embodiment of sub-components that can comprise a locking pawl.

FIG. 13 illustrates a perspective view of an exemplary embodiment of sub-components that can comprise a locking pawl 500. The locking pawl functions to stop the lifter/descender 100 from 'free-spooling' and dropping the feeder abruptly to the ground if the user inadvertently releases the crank 200. The locking pawl 500 comprises a pawl 510 which has a pawl tooth 511 on a distal end. The pawl tooth 511 is the portion of the pawl 510 that engages with the ratchet spool to lock it in place (see earlier discussions).

The pawl mounting port 512 is a port through the pawl 510 that allows the pawl to be mounted on a single shaft on which it can rotate freely. The single shaft in the embodiment of FIG. 13 is the pawl mounting screw 513. This screw 513 is inserted through the pawl 510 and into a mounting plate in the main housing.

A plurality of screw locks 514 can be used to lock the pawl onto the pawl mounting screw so that it is free to rotate about the screw 513, but otherwise in unable to be moved. In other embodiments, other means of holding the pawl 510 in place while allowing it to rotate about a single shaft are contemplated.

A pawl tension mount 520 is located on the pawl 510. The mount 520 provides a location on which a pawl tension spring 522 can be affixed. The spring 522 pulls downwards on the pawl 510, ensuring that the pawl stays engaged with the ratchet spool 400, unless the pawl release is actuated to rotate the pawl counterclockwise and disengage the pawl tooth from the ratchet spool.

The pawl release mount 530 is also located on the pawl 510. The mount 530 provides a location on which a pawl release can attach to the pawl. When the pawl release is actuated, it pulls down on the pawl release mount 530, causing the pawl 510 to rotate counterclockwise on the screw 513 and raises the pawl tooth from engagement with the ratchet spool, allowing the spool to rotate in either direction without interference from the pawl.

A secondary pawl release mount 540 is illustrated in the embodiment of FIG. 13. Secondary (or additional) pawl release mounts can be utilized as desired to adjust the leverage and spring disengagement tension.

FIG. 14A illustrates a perspective view of an exemplary embodiment of a descender body 310. The descender body 310 mounts within the main housing on a mounting plate and holds/guides the controlled descender 300 components. The descender body 310 comprises a descender base 311 attached to two descender sidewalls 312 and 313. Extending at an angle between the two sidewalls is a descender wedge 314 that acts upon the brake pad 350 (see FIG. 14B) to direct the pad down onto the ratchet spool 400 when braking force is desired.

FIG. 14B illustrates a perspective view of an exemplary embodiment of sub-components that can comprise a controlled descender and pawl release. The pawl release expansion spring 320 attaches to the pawl release mount 530 (or secondary/other pawl release mounts) and pulls downwards thereon when the pawl release is actuated. This causes the pawl 510 to rotate counterclockwise and disengage the pawl tooth from the ratchet spool.

The connecting member mount 330 attaches the pawl release expansion spring 320 to the connecting member 380 and entraps the brake pad compression spring 340 on the connecting member 380 between the connecting member mount 330 and the brake pad 350. The brake pad 350 slides along on the connecting member 380 and is pushed downwards towards the descender wedge 314 by the compression spring 340. On the other side of the brake pad 350 is a push rod sleeve 360 which slides along the connecting member 380 and pushes the brake pad upwards when the connecting member 380 is pushed upwards. This is accomplished because the push rod sleeve 360 contacts the push rod lock 370 which is fixed in place on the connecting member 380. When the connecting member 380 is pulled downwards, a gap can form between the push rod sleeve 360 and the brake pad and/or between the push rod sleeve 360 and the push rod lock 370.

A connecting member compression spring 390 rides on the connecting member 380 below the push rod lock 370. It presses against the inside of the housing base 313 and resists downwards force imparted by the cam lock 395 on the connecting member 380 when the cam lock is actuated and pulls the connecting member 380 downwards. The cam lock 395 attaches to the end of the connecting member 380 that extends through and beyond the housing base 313. When a user wishes to apply the brake, he or she simply actuates the cam lock 395 which pulls downwards on the connecting member 380, forcing the break pad against the descender wedge 314, and hence, against the ratchet spool 400. The friction of the brake pad rubbing against the ratchet spool slows and/or stops the rotation of the spool.

Figure 15:
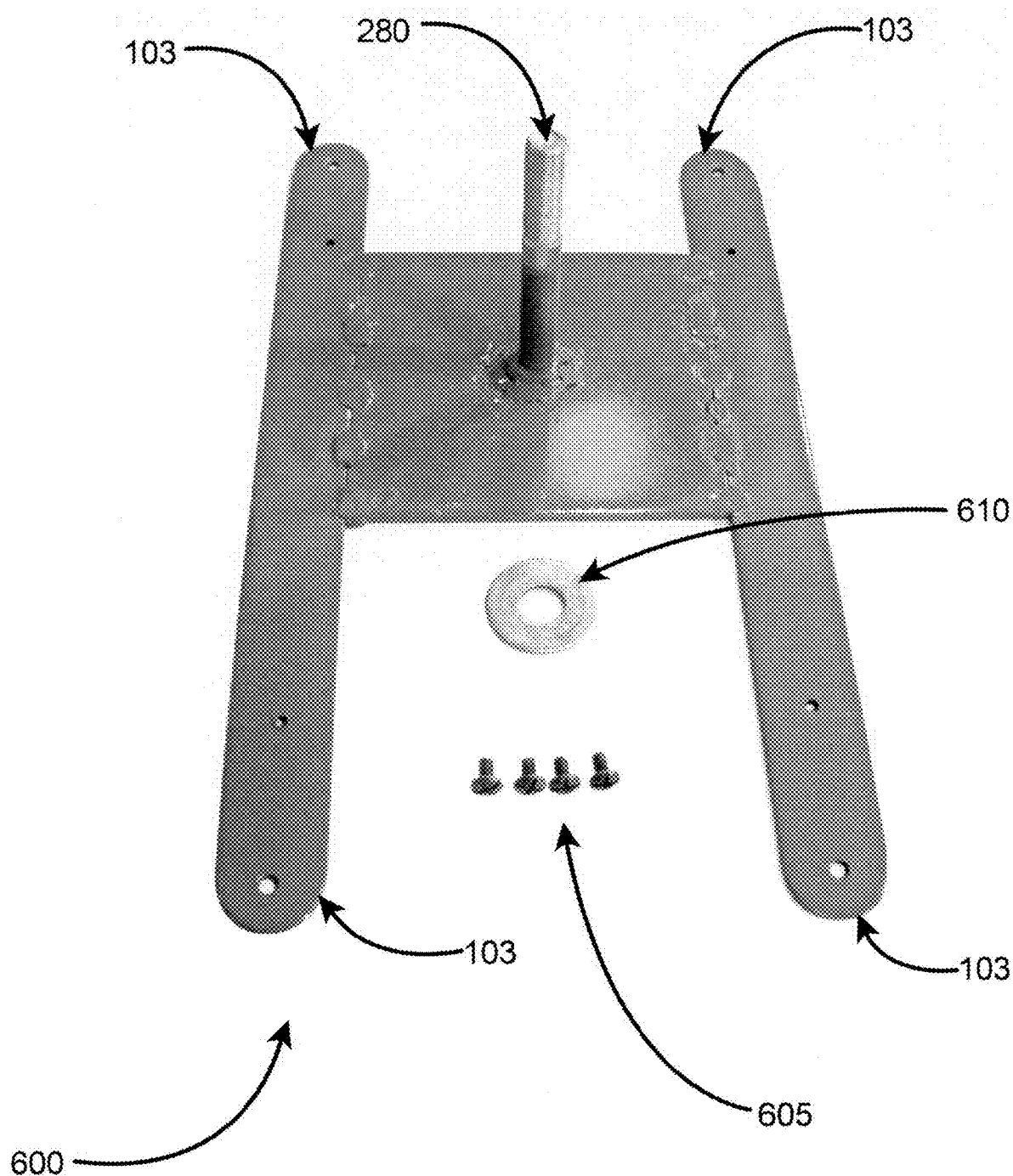
FIG. 15 illustrates a perspective view of an exemplary embodiment of a mounting plate that can be used to mount the rotary high lifter and controlled descender.

FIG. 15 illustrates a perspective view of an exemplary embodiment of a mounting plate 600 that can be used to mount the rotary high lifter and controlled descender to a mounting location. The four depicted mounting screws 605 secure the housing backplate 112 to the mounting plate 600 via the drilled and tapped holes that are penultimate to the holes depicted on the mounting tabs 103 which are used to secure the device to its mounting location with other hardware, not depicted in this illustration. Note that the lifter axle 280 is attached to the mounting plate 600 in the embodiment illustrated in FIG. 15.

An additional component is shown in FIG. 15: a washer 610. This washer can be placed over the lifter axle 280 once the axle 280 has been pushed upwards through the backplate axle port. The washer functions to hold the spool 400 up above the backplate.

While particular embodiments have been described and disclosed in the present application, it is clear that any number of permutations, modifications, or embodiments may be made without departing from the spirit and the scope of this disclosure.

Particular terminology used when describing certain features or aspects of the embodiments should not be taken to imply that the terminology is being redefined herein to be restricted to any specific characteristics, features, or aspects with which that terminology is associated. In general, the terms used in the following claims should not be construed to be limited to the specific embodiments disclosed in the specification, unless the above Detailed Description section explicitly defines such terms. Accordingly, the actual scope of the claims encompasses not only the disclosed embodiments, but also all equivalent ways of practicing or implementing the claimed subject matter.

The above detailed description of the embodiments is not intended to be exhaustive or to limit the disclosure to the precise embodiment or form disclosed herein or to the particular fields of usage mentioned above. While specific embodiments and examples are described above for illustrative purposes, various equivalent modifications are possible within the scope of the disclosure, as those skilled in the relevant art will recognize. Also, the teachings of the embodiments provided herein can be applied to other systems, not necessarily the system described above. The elements and acts of the various embodiments described above can be combined to provide further embodiments.

Any patents, applications and other references that may be listed in accompanying or subsequent filing papers, as well as those listed above, are incorporated herein by reference in their entirety. Aspects of embodiments can be modified, if necessary, to employ the systems, functions, and concepts of the various references to provide yet further embodiments.

In light of the above "Detailed Description," the inventor may make changes to the disclosure. While the detailed description outlines possible embodiments and discloses the best mode contemplated, no matter how detailed the above appears in text, embodiments may be practiced in a myriad of ways. Thus, implementation details may vary considerably while still being encompassed by the spirit of the embodiments as disclosed by the inventor. As discussed herein, specific terminology used when describing certain features or aspects should not be taken to imply that the terminology is being redefined herein to be restricted to any specific characteristics, features, or aspects of the embodiments with which that terminology is associated.

While certain aspects are presented below in certain claim forms, the inventor contemplates the various aspects in any number of claim forms. Accordingly, the inventor reserves the right to add additional claims after filing the application to pursue such additional claim forms for other aspects.

The above specification, examples and data provide a description of the structure and use of exemplary implementations of the described systems, articles of manufacture and methods. It is important to note that many implementations can be made without departing from the spirit and scope of the invention.

What is claimed is:

1. A rotary high lifter and controlled descender for raising and lowering a feeder, comprising:
   a main housing having a front, a rear and a sidewall;
   an adjustable leverage crank is anterior to the front of the main housing such that the adjustable leverage crank can be cranked selectively between one of a first direction and a second direction;
   the adjustable leverage crank fits over a lifter axle;
   a ratchet spool fits over the lifter axle and rotating the adjustable leverage crank causes the ratchet spool to rotate;
   a locking pawl interacts with the ratchet spool to impede rotation of the ratchet spool;
   the ratchet spool comprises a ratchet gear attached to a spool;
   the spool comprises an upper spool plate and a lower spool plate separated from one another by a spool hub;
   the spool hub connects the upper spool plate to the lower spool plate and provides the structure around which a suspension rope is wound;
   the suspension rope extends out of the main housing and has a suspension rope distal end which is attached to the feeder and when the suspension rope is wound around the spool hub, the suspension rope is drawn into the main housing, and the feeder is raised up;
   the ratchet gear comprises a plurality of ratchet teeth separated from one another by a plurality of pawl stops;
   the locking pawl comprises a pawl tooth, the locking pawl selectively engaging with the plurality of pawl stops;
   the plurality of pawl stops each provide a location in which the pawl tooth engages and thereby stops and holds the ratchet spool in place against a turning pressure exerted on the ratchet spool by a weight of the feeder attempting to pull the suspension rope from the spool;

a pawl tension mount is located on the locking pawl;

the pawl tension mount is attached to a pawl tension spring which pulls on the locking pawl and ensures that the locking pawl continues to interact with the ratchet spool, engaging the pawl tooth within subsequent pawl stops as the ratchet spool is rotated the first direction;

a pawl release is attached to the locking pawl and when actuated, the pawl release repositions the locking pawl, stopping the interaction between the pawl tooth and the pawl stops, thereby disengaging the pawl tooth from the ratchet spool and freeing the ratchet spool to turn the second direction without encumbrance from the locking pawl;

a cam lock is selectively actuatable by a user between a locked position and an unlocked position;

when the user places the cam lock in the unlocked position, the cam lock ensures that the locking pawl is engaged with the ratchet spool thereby causing the rotary high lifter and controlled descender to hold the feeder in place against rotation of the spool in the second direction;

when the user places the cam lock in the locked position, the cam lock actuates the pawl release, thereby repositioning the locking pawl, stopping the interaction between the pawl tooth and the pawl stops, disengaging the pawl tooth from the ratchet spool and freeing the ratchet spool to turn the second direction without encumbrance from the locking pawl; and wherein placing the cam lock in the locked position also actuates a controlled descender which comprises a brake pad that is drawn down onto the spool when actuated and frictionally engages with the spool to slow rotation thereof.

2. The rotary high lifter and controlled descender of claim 1, wherein the adjustable leverage crank further comprises:

a crank base that has a crank engagement and a base extension;

a crank handle having a handle extension slidably attached to the crank base and having a crank grip extending generally perpendicular to the handle extension and providing a handgrip for the user to grasp and turn the adjustable leverage crank;

the crank engagement engages with the ratchet spool so that any turning of the adjustable leverage crank causes the ratchet spool to turn;

the base extension extending generally perpendicular to the crank engagement and thereby providing leverage by extending a diameter of a circle traversed by the crank grip as the crank grip is turned by the user;

the base extension incorporates a crank adjustment slot that slidably engages with the handle extension to adjust the diameter of the said circle;

a crank adjustment lock tightens and locks the base extension in place to the handle extension;

a tension knob which holds the adjustable leverage crank onto the lifter axle; and tightening the tension knob increases friction and reduces the rotational speed of the spool.

3. The rotary high lifter and controlled descender of claim 2, wherein the crank base further comprises:

a crank engagement that extends into the main housing and connects to the ratchet spool via a plurality of crank engagement prongs; and the crank engagement prongs engage slots in the ratchet spool so that rotation of the crank base causes the ratchet spool to rotate.

\* \* \* \* \*